United States Patent
Gaucherot

[19]
[11] Patent Number: 5,967,564
[45] Date of Patent: Oct. 19, 1999

[54] TIGHT COUPLING BETWEEN TWO EQUIPMENTS SUCH AS PIPES

[75] Inventor: Jacques Gaucherot, Cherbourg, France

[73] Assignee: Compagnie Generale des Matieres Nucleaires, Velizy-Villacoublay, France

[21] Appl. No.: 09/065,679

[22] Filed: Apr. 23, 1998

[30] Foreign Application Priority Data

May 13, 1997 [FR] France ................................ 97 05837

[51] Int. Cl.[6] .................................................. F16L 55/00
[52] U.S. Cl. ........................... 285/23; 285/407; 285/411; 24/279
[58] Field of Search ............................ 285/23, 407, 408, 285/410, 411, 398; 24/279, 282, 483

[56] References Cited

U.S. PATENT DOCUMENTS

| | | | |
|---|---|---|---|
| 1,782,484 | 11/1930 | Spencer et al. | 285/398 X |
| 5,415,435 | 5/1995 | Colbert | 285/23 |
| 5,820,166 | 10/1998 | Webb | 285/23 |
| 5,868,442 | 2/1999 | Lin | 285/411 X |
| 5,873,611 | 2/1999 | Munley et al. | 285/410 X |

FOREIGN PATENT DOCUMENTS

| | | |
|---|---|---|
| 1287128 | 1/1962 | France . |
| 1546776 | 5/1979 | United Kingdom . |
| WO 97/11301 | 3/1997 | WIPO . |

*Primary Examiner*—Janet M. Wilkens
*Assistant Examiner*—Karlena D Schwing
*Attorney, Agent, or Firm*—Pearne, Gordon, McCoy & Granger LLP

[57] ABSTRACT

The connection or coupling between two equipments such as pipes (1 and 2) by a clamp (17) involves the use of a second clamp (8), tightened around the fixed pipe (1) and carrying a cradle (9) for supporting the clamp (17). This arrangement makes it possible to place the coupling parts in succession and to release them immediately afterwards. The cradle (9) also prevents the clamp (17) from tilting when its clamping screw (22) is turned. Finally, a sleeve (27) maintains the extension position of the pipes (1, 2), while also centering the sealing joint (32). All these advantages make it possible to correctly and easily assemble the parts with a single remote manipulator in the hot cells of nuclear installations.

6 Claims, 1 Drawing Sheet

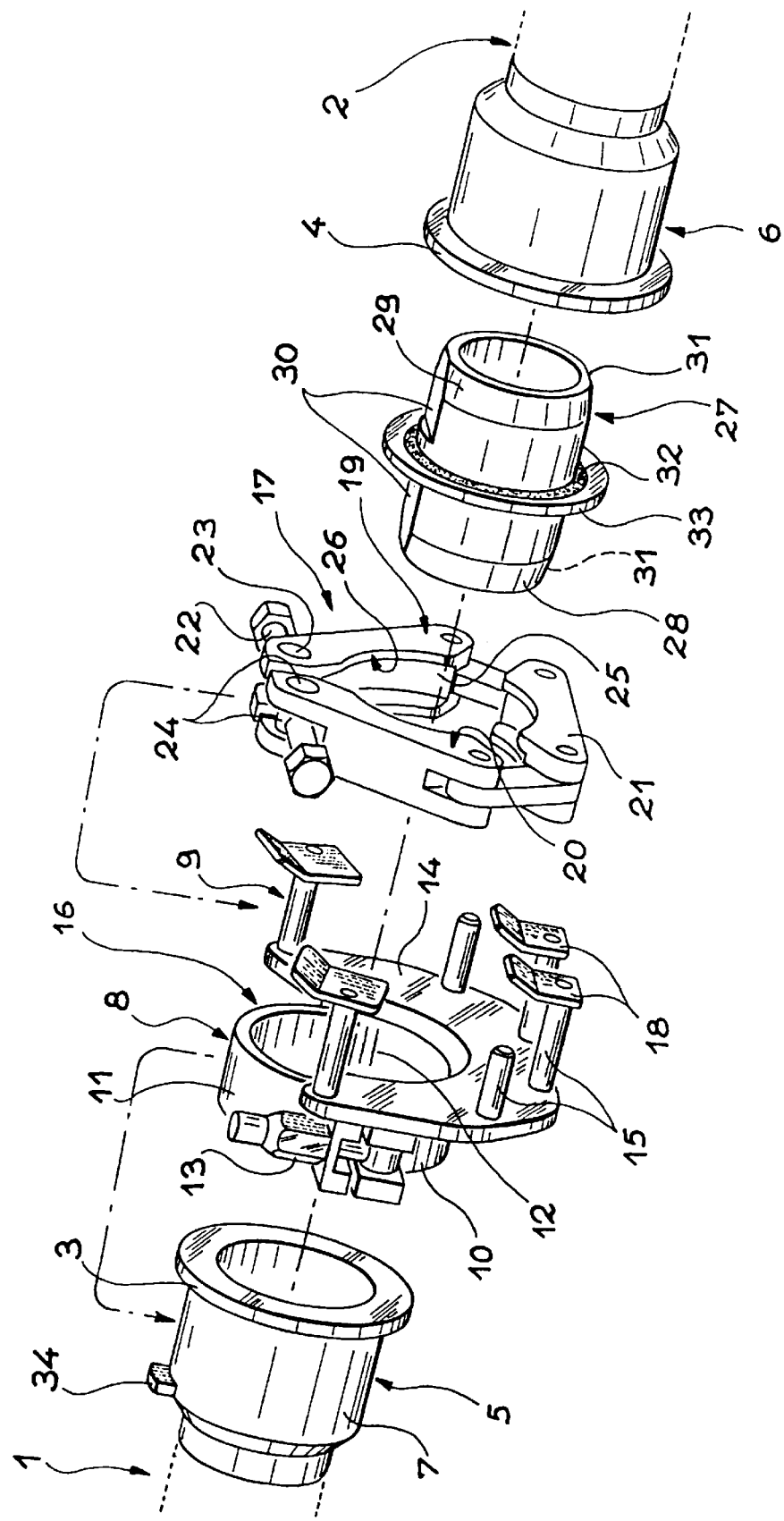

TIGHT COUPLING BETWEEN TWO EQUIPMENTS SUCH AS PIPES

BACKGROUND OF THE INVENTION

The invention relates to a tight coupling between two equipments such as pipes terminated by flanges and between which is compressed a sealing joint or seal, said flanges being joined and moved together by a clamp. It is more particularly used in nuclear installations, where maintenance imposes frequent replacements of the seals in the cells, where it is only possible to work by using remote manipulators.

A sought fundamental aim here is to obtain a coupling, which can be easily correctly established by remote manipulation. In order to bring about the moving together and assembly of two points in extension of one another and between which is compressed a seal, couplings are already known in the form of bolted flanges and also quick-release couplings using a ratching or snapping in of the parts, but the first do not lend themselves to remote manipulations, because they require the simultaneous presence of two remote manipulators, whereof one holds one of the pipes against the other and the second ensures the bolting of the flanges, which requires attention to minute detail and time, as well as suitable tools and a relatively large manipulating space, whereas the second also generally requires two remote manipulators, whereof the first is once again responsible for holding one of the pipes, whereas the other manipulates the coupling part. These quick-release couplings generate high force reactions on the piping members and on the remote manipulators during the ratching or uncoupling of their ends. Moreover, the seals used in quick-released couplings are generally inseparable therefrom by remote manipulation, which makes it necessary to replace the entire coupling and neighbouring pipe when the seal has to be changed.

Clamp-based couplings make it possible to easily produce quick-release couplings by interposing between the pipes a seal, which can be replaced alone. This is why these couplings are preferred in this technical field, but hitherto they have required the simultaneous presence of two remote manipulators, one holding the clamp on the fixed pipe and the other placing the seal and then the end of the mobile pipe prior to the tightening of the clamp. The invention obviates the need for one of the remote manipulators for carrying out the coupling. It also permits the replacement in the remote manipulator of the sleeve carrying the seal, as well as the replacement of the clamp or clamp holder.

SUMMARY OF THE INVENTION

Its original nature results from the use of a pipe centering sleeve and a clamp holder comprising a support clamp tightened on a portion of one of the pipes adjacent to the flanges and a cradle for receiving the clamp comprising bars connected to the support clamp and extending round, beneath and alongside the flanges, and terminated opposite to the support clamp by stop locks for preventing lateral movements of the clamp.

The clamp is placed in the reception cradle without it being necessary to hold it by a remote manipulator, whilst the mobile pipe is approached by the pipe carrying the support clamp and its flange is centred by the sleeve and then slid into the opening of the clamp. The mobile pipe can then be released and the clamp is closed again on the flanges in a conventional manner. Another advantage of the aforementioned sleeve is that it solves the hitherto difficultly solvable problem of bringing about a correct centring of the seal in the flanges, it merely being necessary to slip the seal around the sleeve for it to be retained and then being unable to slide.

BRIEF DESCRIPTION OF THE DRAWING

The and other features of the invention will now be described in greater detail relative to the single attached drawing.

DETAILED DESCRIPTION OF PREFERRED EMBODIMENTS OF THE INVENTION

The pipes to be joined consist of a fixed pipe 1 and a mobile pipe 2, each being terminated by a flange 3 or 4 in the form of a collar having a planar end face and an inclined rear face in order to permit, by sliding said inclined face on the internal profile of the clamp 17, the moving together of the two flanges 3 and 4. The flanges 3 and 4 are located at the end of a respective flared mouth 5 and 6 of the pipes 1 and 2 and having a larger diameter than the remainder of the pipes, whilst the mouth 5 of the fixed pipe 1 comprises a cylindrical, external surface 7 terminated at the rear by a stud 34. This external surface 7 serves as a support for a support clamp 8 integral with the most original part of the invention, i.e. the cradle 9. The support clamp 8 is constituted by two semicircular halves 10 and 11 articulated by a hinge 12 to a pair of ends and connected by a bolt 13 to their pair of opposite ends. It is merely necessary to adequately unscrew the bolt 13 in order to be able to slide the support clamp 8 over the flange 3 and then retighten said bolt 13 in order to fix the clamp 8 against the external surface 7.

The cradle 9 firstly comprises a horseshoe-shaped plate 14 fixed to the semicircular half 10 occupying a lower position and whose opening is directed upwards. Thus, the horseshoe 14 passes beneath the flange 3 on fitting the support clamp 8 and extends behind said flange 3 when fitting has taken place. It carries bars 15 directed towards the mobile pipe 2 and which then extend alongside the flange 3 and beneath the latter, whilst defining an upwardly open recess 16, in which can be introduced and engaged a clamp 17. Certain of the bars 15 are terminated by stop locks 18, which prevent the clamp 17 from falling by tilting prior to the installation of the mobile pipe 2.

The clamp 17 is of a known type and comprises two lateral arms 19 and 20 articulated by their lower ends to a base 21 constituting an intermediate link. In the embodiment shown, the base 21 has a lower, horizontal face resting perfectly on two of the bars 15 located at the same level. The tops of the lateral arms 19 and 20 are connected by a clamping screw 22 having two portions threaded in opposite directions and whereof each is engaged in a socket 23 or 24 articulated to one of the respective, lateral arms 19 and 20. On turning the screw 22, opposing moving away or moving in movements are produced on the sockets 23 and 24, so that there is a moving in or away of the lateral arms 19 and 20. Each of the arms 19 and 20 is provided with an inner groove 25 having inclined sides 26 and which is always narrower than the bottom. When the clamp 17 is tightened, the sides 26 enclose the flanges 3 and 4, which slide on them and are moved together.

Beforehand a sleeve 27 has been introduced into the flared mouths 5 and 6 of the pipes 1 and 2. This operation is facilitated by conical ends 28 and 29 of the sleeve 27, which permit the easy introduction thereof, as well as by flaps 30 and 31 carried on its opposite faces and which permit the satisfactory grasping thereof by a single remote manipulator. The sleeve 27 not only facilitates the centering of the pipes 1 and 2, but also that of the seal 32, which is carried by the sleeve 27 and firmly retained through being engaged in a groove formed on its outer surface. Advantageously, the seal 32 is an O-ring integral with a rigid ring 33 formed around it and which is thinner. The rigid ring 33 abuts against the flanges 3 and 4 when coupling takes place and consequently limits the compression of the seal 32, as well as the extrusion thereof.

The stages of producing the coupling have already been described hereinbefore and are also easy to understand. Successively, following the loosening thereof, the support clamp 8 is slid onto the flared mouth 5 of the fixed pipe 1 and is fixed against the outer surface 7, the clamp 17 being placed in the cradle 16. After loosening the clamp 17 to the point where the lateral arms 19 and 20 abut against the bars 15 of the cradle 9, the nut 13 of the clamp 8 is slightly loosened in order to permit the sliding, on the mouth 5 and up to the stud 34, of the assembly constituted by the support clamp 8 and clamp 17. The nut 13 of the support clamp 8 is then retightened. These operations make it possible to position the clamp 17 level with the joining plane of the flanges 3 and 4 of the pipes 1 and 2. The sleeve 27 is then slid into the fixed pipe 1 and then the mobile pipe 2 around the half which has remained free of the sleeve 27, making the flange 4 penetrate between the lateral arms 19 and 20 of the clamp 17 and finally the latter is tightened. All these operations are performed by the same remote manipulator, which releases each of the parts once it has put them into place. However, there is no risk of the coupling parts being displaced prior to tightening taking place, which guarantees the quality of the assembly. In particular, the seal 32 cannot slide between the flanges 3 and 4 and the rotation of the screw 22 produces no tilting of the clamp 17, which is retained by the horseshoe 14, bars 15 and stop locks 18.

The coupling is usable with flexible or rigid pipes having a random inclination. As the sleeve 27 is housed in flared mouths of the pipes, it does not reduce the passage cross-section of the fluid, but keeps it constant between the individual pipes. The addition of the support clamp 8, cradle 9 and sleeve 27 is not expensive and scarcely increases the volume occupied by the coupling. Thus, the conventional advantages of clamp couplings are retained, namely low cost, reduced overall dimensions and lowness of the clamping forces to be applied.

I claim:

1. Tight coupling between two equipments (1, 2) terminated by flanges (3, 4) and between which is compressed a seal (32) and which are joined by a clamp (17), said tight coupling comprising a clamp holder (8, 9) incorporating a support clamp (8) tightened on a portion (5) of one of the equipments (1) adjacent to the flanges (3, 4) and a cradle (9) for supporting the clamp (17), said cradle having a plurality of bars (15) connected to the support clamp (8) and extending beneath and alongside the flanges (3, 4) to collectively form a support for the clamp (17), at least a portion of said bars terminated by stop locks (18) for preventing lateral movements of the clamp (17) away from the support clamp (8) when the clamp is supported on the cradle.

2. Tight coupling according to claim 1, further comprising a sleeve (27) sliding in the equipments and permitting their centering thereof and around which is held the seal (32).

3. Tight coupling according to claim 2, an outer surface of the sleeve is provided with opposite flaps (30, 31).

4. Tight coupling according to claim 2, characterized in that the sleeve (27) is housed in flared mouths (5, 6) of the equipments, whilst maintaining a constant fluid passage cross-section between the individual equipments.

5. Tight coupling according to claim 1, characterized in that the seal (32) is surrounded by a thinner ring (33) preventing its extrusion during the tightening of the seal.

6. Tight coupling according to claim 1, wherein said plurality of bars form an upwardly open recess into which the clamp (17) can be inserted and supported.

* * * * *